United States Patent
Chavva et al.

(10) Patent No.: US 10,944,582 B2
(45) Date of Patent: Mar. 9, 2021

(54) METHOD AND APPARATUS FOR ENHANCING MULTICAST GROUP MEMBERSHIP PROTOCOL(S)

(71) Applicant: Telefonaktiebolaget LM Ericsson (publ), Stockholm (SE)

(72) Inventors: Gangadhara Reddy Chavva, Karnataka (IN); Kotesh Babu Chundu, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/608,439

(22) PCT Filed: May 12, 2017

(86) PCT No.: PCT/IB2017/052819
§ 371 (c)(1),
(2) Date: Oct. 25, 2019

(87) PCT Pub. No.: WO2018/207005
PCT Pub. Date: Nov. 15, 2018

(65) Prior Publication Data
US 2020/0195457 A1    Jun. 18, 2020

(51) Int. Cl.
*H04L 12/00*    (2006.01)
*H04L 12/18*    (2006.01)
*H04L 29/08*    (2006.01)

(52) U.S. Cl.
CPC ........ *H04L 12/185* (2013.01); *H04L 12/1863* (2013.01); *H04L 12/1895* (2013.01); *H04L 67/26* (2013.01)

(58) Field of Classification Search
CPC . H04L 12/1863; H04L 12/1895; H04L 67/26; H04L 12/185

(Continued)

(56) References Cited

U.S. PATENT DOCUMENTS 7,512,128 B2 *  3/2009  DiMambro ............. H04L 29/06
                                              370/393
7,720,016 B2 *  5/2010  Tsang .................... H04L 47/724
                                              370/310

(Continued)

OTHER PUBLICATIONS

Asaeda et al., "Tuning the Behavior of IGMP and MLD for Mobile Hosts and Routers, draft-ietf-multimob-igmp-mld-tuning-00", MULTIMOB Working Group, Internet-Draft, May 27, 2011, pp. 1-15.

(Continued)

*Primary Examiner* — Frantz Coby
(74) *Attorney, Agent, or Firm* — Nicholson De Vos Webster & Elliott LLP

(57) ABSTRACT

A method and an apparatus for enhancing multicast group membership protocols are described. An adjacent multicast network device, coupled with a plurality of host NDs, determines the number of host NDs that are to receive query messages. The adjacent multicast ND determines its current processing capacity for processing group membership reports to be received from the host NDs. The adjacent multicast ND determines a query response interval based on the number of host NDs and its current processing capacity. The adjacent multicast ND transmits, to each one of the plurality of host NDs, a query message including the query response interval. The query message causes the adjacent multicast ND to receive from each one of the plurality of host NDs a group membership report at a time interval defined based on the query response interval.

24 Claims, 9 Drawing Sheets

(58) Field of Classification Search
USPC .................................................. 709/206, 207
See application file for complete search history.

(56) References Cited

U.S. PATENT DOCUMENTS

| | | | |
|---|---|---|---|
| 8,270,406 B2* | 9/2012 | Park .................... | H04L 63/1466 |
| | | | 370/390 |
| 2011/0206373 A1 | 8/2011 | Osugi | |
| 2012/0106425 A1* | 5/2012 | Janakiraman ......... | H04L 12/185 |
| | | | 370/312 |
| 2016/0013967 A1* | 1/2016 | Chen .................... | H04L 43/0882 |
| | | | 370/236 |

OTHER PUBLICATIONS

Cain et al., "Internet Group Management Protocol, Version 3", Network Working Group, Request for Comments: 3376, Oct. 2002, pp. 1-53.

Fenner et al., "Protocol Independent Multicast—Sparse Mode (PIM-SM): Protocol Specification (Revised)", Network Working Group, Request for Comments: 4601, Aug. 2006, pp. 1-112.

Vida et al., "Multicast Listener Discovery Version 2 (MLDv2) for IPv6", Network Working Group, Request for Comments: 3810, Jun. 2004, pp. 1-62.

* cited by examiner

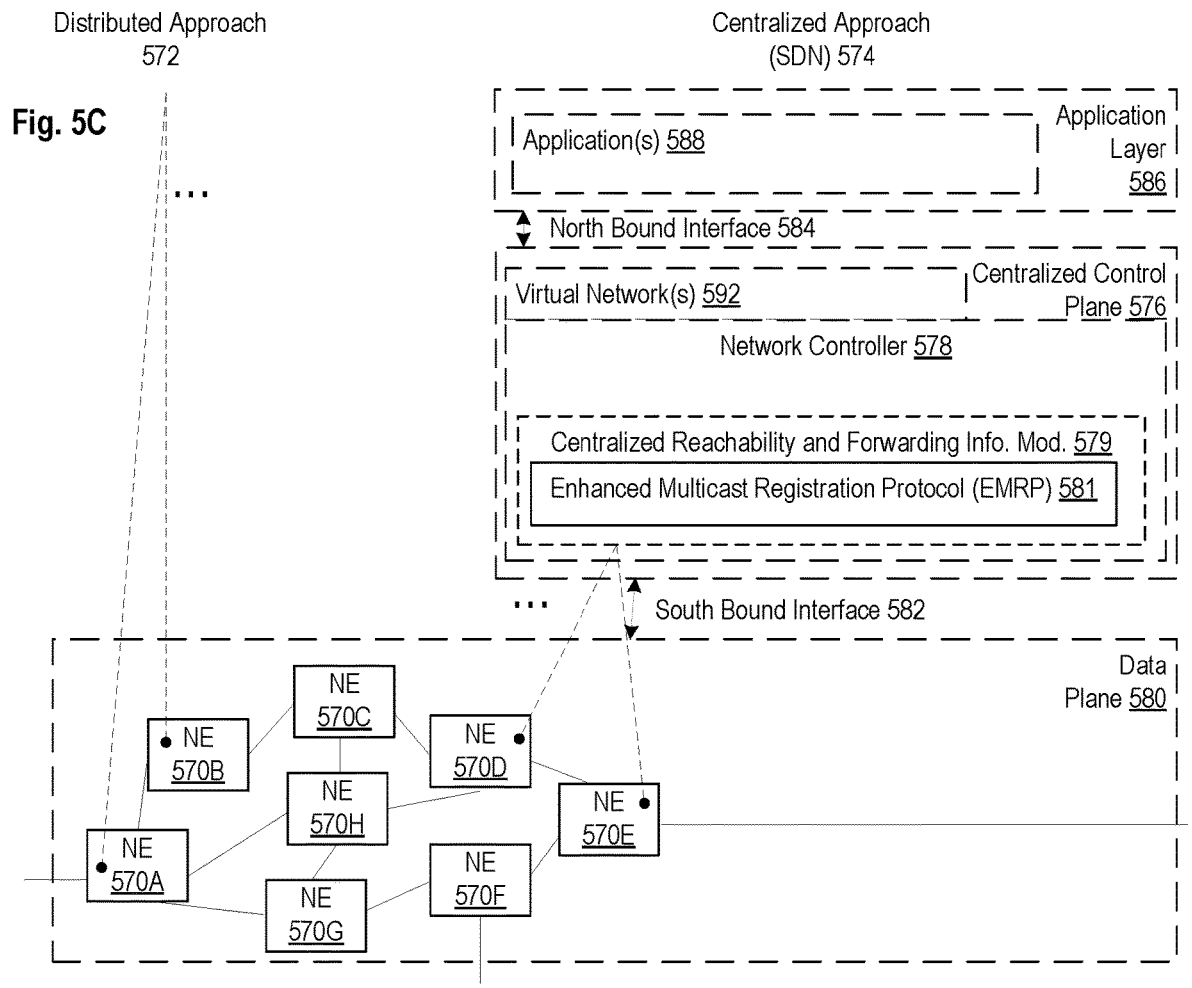

METHOD AND APPARATUS FOR ENHANCING MULTICAST GROUP MEMBERSHIP PROTOCOL(S)

CROSS-REFERENCE TO RELATED APPLICATIONS

This application is a National stage of International Application No. PCT/IB2017/052819, filed May 12, 2017, which is hereby incorporated by reference.

TECHNICAL FIELD

Embodiments of the invention relate to the field of packet networks; and more specifically, to enhancing multicast group membership protocol(s).

BACKGROUND

Internet Protocol Multicast is a technology that enables point-to-multipoint communication. It is often employed for streaming media applications on the Internet and private networks. It uses reserved multicast address blocks in IPv4 and IPv6. For example, IP multicast is heavily used by service providers of IP television (IPTV) services for transporting the IPTV traffic from sources to customers that subscribe to the IPTV services (or as they may be referred to herein as subscribers).

In IPv4 networks, the Internet Group Management Protocol (IGMP) is a communications protocol used by host network devices and adjacent multicast network devices (e.g., an adjacent multicast router) to establish multicast group memberships. Alternatively, in IPv6 networks, the Multicast Listener Discovery (MLD) is used by the host network devices and the adjacent multicast network devices to establish the multicast group memberships. Using one of these two protocols the host network devices express their interest in a specific IP multicast group membership to an adjacent multicast network device by transmitting group membership reports. The membership reports are generated periodically sent by the host network devices in response to the receipt of query messages from the adjacent multicast network device. Once the adjacent multicast network device receives all the group membership reports from multiple host NDs, these reports are processed at the data plane, which triggers the creation of multicast distribution trees using Protocol Independent Multicast protocol (PIM).

In a typical network configuration an adjacent multicast ND may be coupled to tens of thousands to hundreds of thousands of host NDs. For example, the adjacent multicast ND can be coupled to twenty thousand host NDs and may send periodic query messages to these hosts. According to the IGMP/MLD protocols, upon receipt of a query message from the adjacent multicast ND, each host responds at a random time within a query response interval that is identified by the adjacent multicast ND in the query message. Thus, the adjacent multicast ND receives responses from the twenty thousand host NDs and may not be able to process all these reports within this time interval resulting in a drop of some of these report packets. This causes expiration of some of multicast entries in the adjacent multicast ND and consequently causes traffic loss. This issue can be particularly problematic in broadband network gateways (BNG) that terminate IGMP/MLD protocols, as these gateways are coupled with increasing numbers of hosts and need to handle a high number of queries and multicast reports within a small amount of time. Thus, with current IGMP/MLD protocol implementations, networks supporting multicast services face challenging performance issues caused by the increasing number of hosts that an adjacent multicast ND needs to support.

SUMMARY

One general aspect includes a method of enhancing multicast group membership protocol, the method including: determining, at an adjacent multicast network device (ND) that is operative to perform multicast group membership registration of a plurality of host NDs, a number of host NDs that are to receive query messages; determining current processing capacity of the adjacent multicast ND for processing group membership reports to be received from the host NDs; determining a query response interval based on the number of host NDs and the current processing capacity; and transmitting, to each one of the plurality of host NDs, a query message including the query response interval, where the query message causes the adjacent multicast ND to receive from each one of the plurality of host NDs a group membership report at a time interval defined by the query response interval.

One general aspect includes a network device for enhancing multicast group membership protocol, the network device including: a non-transitory computer readable storage medium to store instructions; and a processor coupled with the non-transitory computer readable storage medium to process the stored instructions to determine, at an adjacent multicast network device (ND) that is operative to perform multicast group membership registration of a plurality of host NDs, a number of host NDs that are to receive query messages, determine current processing capacity of the adjacent multicast ND for processing group membership reports to be received from the host NDs, determine a query response interval based on the number of host NDs and the current processing capacity, and transmit, to each one of the plurality of host NDs, a query message including the query response interval, where the query message causes the adjacent multicast ND to receive from each one of the plurality of host NDs a group membership report at a time interval defined by the query response interval.

One general aspect includes a non-transitory computer readable storage medium that provide instructions, which when executed by a processor of a proxy server, cause said processor to perform operations including: determining, at an adjacent multicast network device (ND) that is operative to perform multicast group membership registration of a plurality of host NDs, a number of host NDs that are to receive query messages; determining current processing capacity of the adjacent multicast ND for processing group membership reports to be received from the host NDs; determining a query response interval based on the number of host NDs and the current processing capacity; and transmitting, to each one of the plurality of host NDs, a query message including the query response interval, where the query message causes the adjacent multicast ND to receive from each one of the plurality of host NDs a group membership report at a time interval defined by the query response interval.

BRIEF DESCRIPTION OF THE DRAWINGS

The invention may best be understood by referring to the following description and accompanying drawings that are used to illustrate embodiments of the invention. In the drawings:

FIG. 5C illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

DETAILED DESCRIPTION

Figure 1:
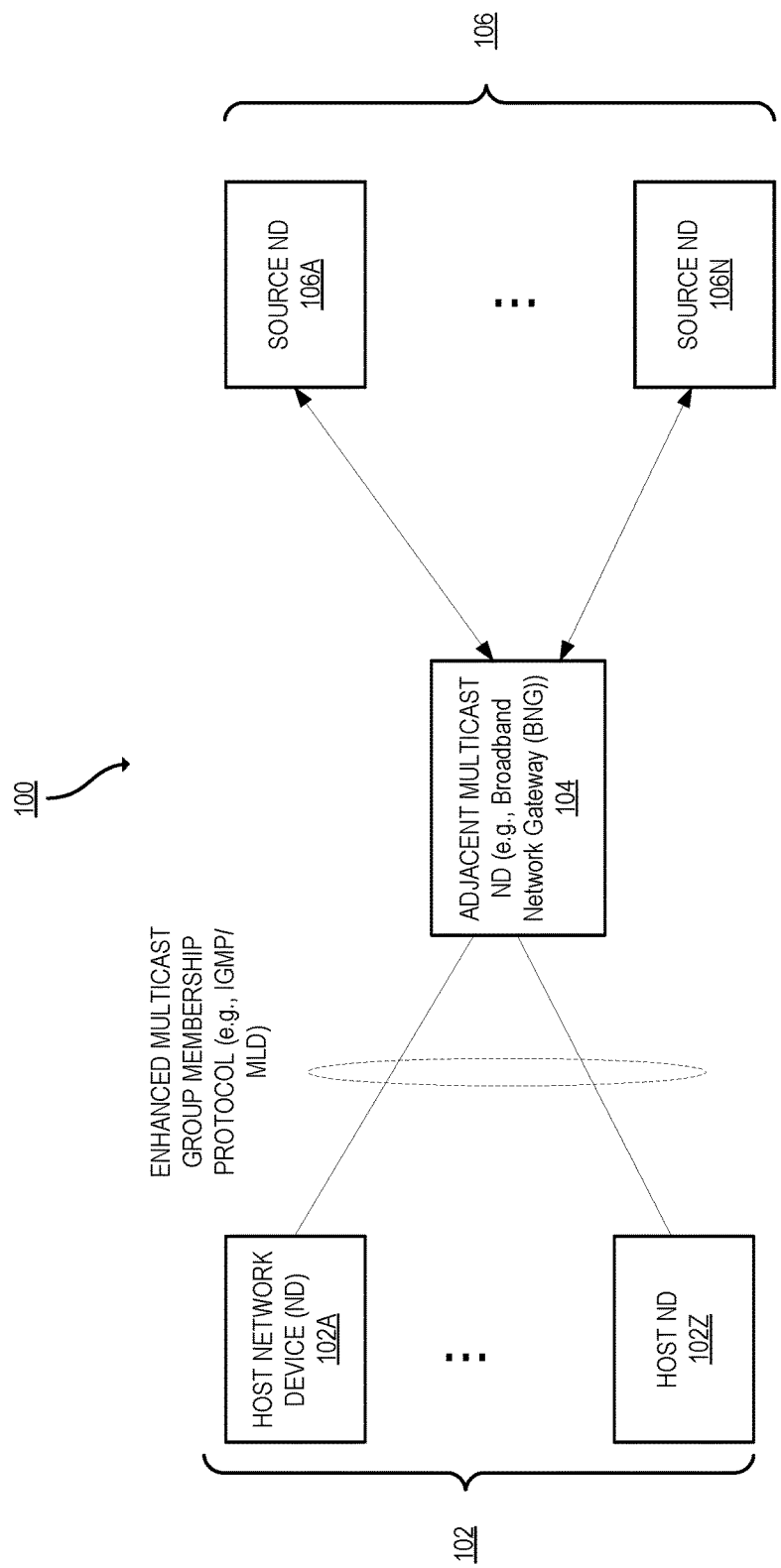
FIG. 1 illustrates a block diagram of an exemplary network including an adjacent multicast network device enabling an enhanced multicast group membership registration, in accordance with some embodiment.

The following description describes methods and apparatus for enhancing multicast group membership protocol. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments described below provide methods and apparatuses for dynamically adjusting a query response interval (QRI) of multicast group membership protocols (e.g., Internet Group Management Protocol (IGMP) or Multicast Listener Discovery (MLD)). The QRI is dynamically determined based on the number of host network devices coupled with an adjacent multicast ND that are enabled for that adjacent multicast ND, as well as based on the adjacent multicast ND's processing capability. Thus contrary to standard approaches, in which the QRI field of a query message (that is sent by the adjacent multicast ND) is static, the embodiments of the present invention enable a dynamic QRI value that is adaptable to the number of hosts and adaptable to the platform processing capability/capacity. The dynamic determination of the QRI allows to smoothen the burstiness of the membership reports of the multicast group membership protocols (such as IGMP and MLDP) and enables better scalability and reliability of the adjacent multicast ND when offering multicast functionality.

A method and an apparatus for enhancing multicast group membership protocols are described. An adjacent multicast network device coupled with a plurality of host NDs, determines the number of host NDs that are to receive query messages, where the adjacent multicast ND is operative to perform multicast group membership registration of the plurality of host NDs. The adjacent multicast ND determines its current processing capacity for processing group membership reports to be received from the host NDs. The adjacent multicast ND determines a query response interval based on the number of host NDs and its current processing capacity. The adjacent multicast ND transmits, to each one of the plurality of host NDs, a query message including the query response interval. The query message causes the adjacent multicast ND to receive from each one of the plurality of host NDs a group membership report at a time interval defined based on the query response interval.

In some embodiments, the operations are repeated such that the adjacent multicast ND can dynamically determine a query response interval that is based on current processing power and capacity of the adjacent multicast ND as well as on the number of NDs that are to receive these query messages.

FIG. 1 illustrates a block diagram of an exemplary network including an adjacent multicast network device enabling an enhanced multicast group membership registration, in accordance with some embodiment. The exemplary network 100 includes a set of one or more host network devices ND 102A-102Z, an adjacent multicast ND 104, and a set of one or more source NDs 106A-106N. Each one of the host NDs are network devices operative to register with the adjacent multicast ND 104 to receive packets of multicast streams originating from one or more of the source NDs 106A-106N. The network 100 can include any number of host NDs 102A-Z and source NDs 106A-106N. Each one of the source NDs can be coupled through the adjacent multicast ND 104 to any number of host NDs. While the embodiments will be described with respect to each host ND coupled with the adjacent multicast ND 104 through a direct link, one of ordinary skill in the art would understand that this link is intended to be a logical representation (rather than a physical representation) of the communication link between the host ND and the adjacent multicast ND 104. While the embodiments herein will be described with each host or source implemented on a respective network device, in other embodiments, one or more hosts or alternatively one or more sources can be implemented on a single network device. In a similar manner, while the embodiments will be described with respect to each source ND coupled with the adjacent multicast ND 104 through a direct link, one of ordinary skill in the art would understand that this link is intended to be a logical representation (rather than a physical representation) of the communication link between the source ND and the adjacent multicast ND 104. ND 104 is operative to communicate with the host ND to enable registration of the host NDs 102A-Z for receiving traffic of one or more multicast streams.

In some embodiments, the adjacent multicast ND 104 is a Broadband Network Gateway (BNG) and is coupled with a large number of BNG subscribers (i.e., the host NDs). In a typical network configuration the adjacent multicast ND 104 may be coupled to tens of thousands to hundreds of thousands of host NDs 102A-Z. For example, the adjacent multicast ND 104 is a BNG administered by an Internet Protocol Television (IPTV) service provider that offers multicast services to the IPTV subscribers.

The adjacent multicast ND 104 implements a multicast group membership protocol such as IGMP or MLD. The adjacent multicast ND 104 transmits query messages and receives group membership reports in response to the query messages. These query messages received on the data plane of the adjacent multicast ND 104 are punted to the control plane of the adjacent multicast ND 104 for processing and enable each one of the host NDs 102A-Z to register for multicast traffic streams.

In some embodiments, when punting the control packets to the control plane, the data plane limits the rate at which the packets are transmitted towards the control plane to protect the control plane. In scenarios where the adjacent multicast ND 104 is coupled with a large number of host NDs, the control plane of the adjacent multicast ND 104 may receive group membership reports from the host NDs in a bursty manner. When the number of host NDs is large and consequently the number of group membership reports punted to the control plane is large, some packets may be dropped at the control plane of the adjacent multicast ND 104, which affects the reliability of the multicast service offered through the adjacent multicast ND 104. In these scenarios, some of the host NDs may not learn the group membership reports are dropped. For example, in a scenario of an IPTV application, bustiness of the group membership reports can result in a frequent flapping of IPTV channels resulting in a degraded user experience.

Several approaches can be used to address the limitations of standard group membership registration processes. In one approach, the control packets including the group membership reports received at the adjacent multicast ND 104 can be buffered prior to being processed to ensure that none are dropped. This approach requires substantial storage at the control plane of the adjacent multicast ND 104 to ensure that all packets can be buffered and processed. In another approach, the CPU capacity at the control plane of the adjacent multicast ND 104 can be significantly increased. However, similarly to the previous approach discussed, this also requires additional computing resources at the adjacent multicast ND 104. These two approaches present the disadvantage of requiring large resources such as memory and/or processing power, while not solving the scalability issues that arise from having increasing numbers of host NDs.

Enhanced Multicast Group Membership Protocols:

The embodiments of the present invention enable an enhanced multicast group membership registration. The enhanced multicast group membership registration process avoids the burstiness of the group membership reports by transmitting feedback information to the host NDs and allowing the system to rely on a dynamic query response interval instead of a static QRI.

Figure 2A:
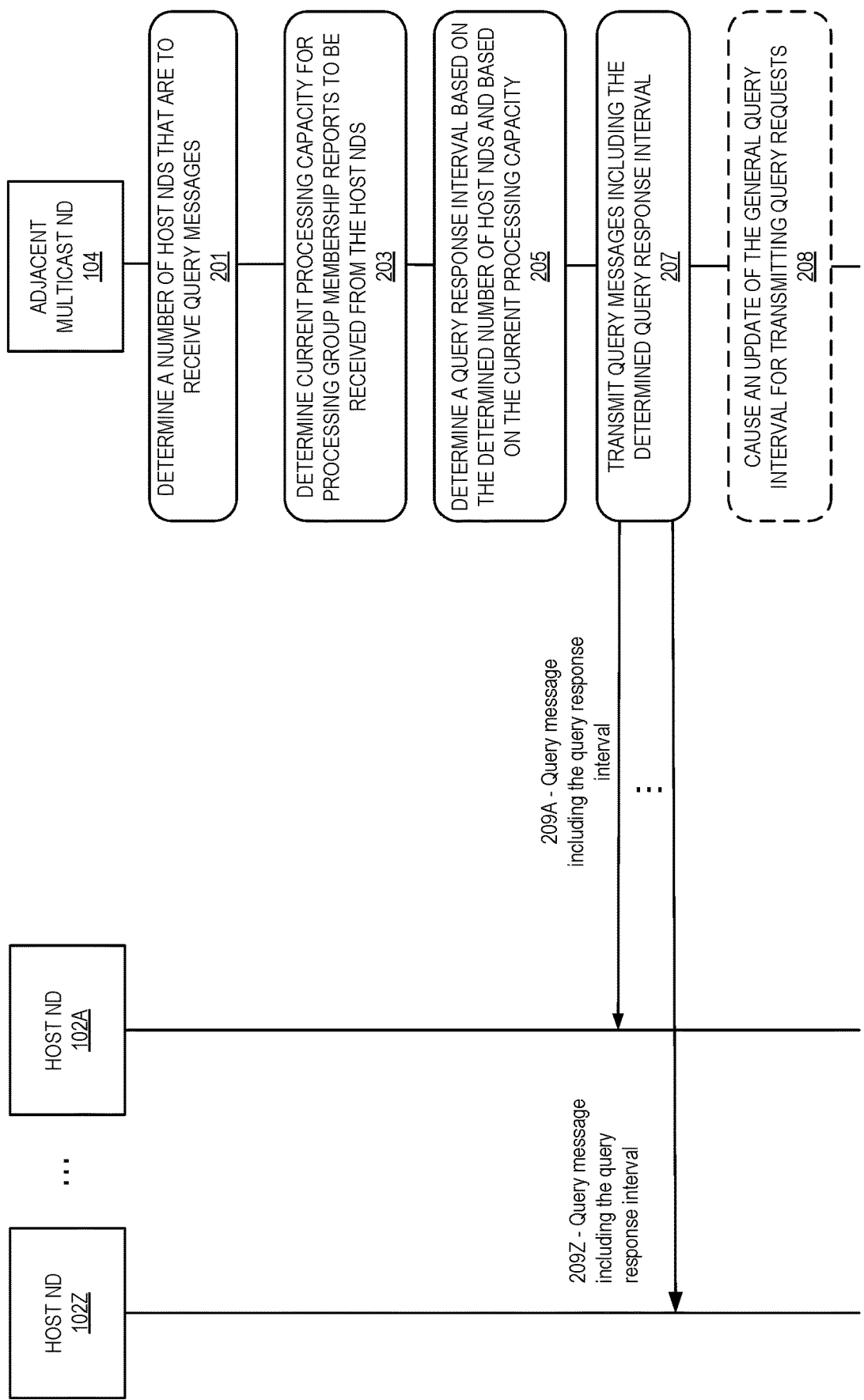
FIG. 2A illustrates a transactional diagram of exemplary operations for transmitting query messages according to an enhanced multicast group membership registration process, in accordance with some embodiments.

FIG. 2A illustrates a transactional diagram of exemplary operations for transmitting query messages according to an enhanced multicast group membership registration process, in accordance with some embodiments. The adjacent multicast ND 104 is operative to perform multicast group membership registration of a plurality of host NDs (e.g., host NDs 102A-102Z). For example, the adjacent multicast ND 104 is coupled with a plurality of host NDs that enable subscribers of an IPTV service to access IP multicast streams.

At operation 201, the adjacent multicast ND 104 determines a number of host NDs that are to receive query messages. In some embodiments, the adjacent multicast ND 104 maintains the number of host NDs that are coupled with it and looks up this number at operation 210 to determine the number of host NDs that are to receive query messages. For example, in the IPTV application scenario, the adjacent multicast ND 104 may maintain the number of subscribers that subscribe for the IPTV service and this number corresponds to the number of host NDs that are to receive the query message.

At operation 203, the adjacent multicast ND determines its current processing capacity for processing group membership reports to be received from the host NDs. For example, the adjacent multicast ND 104 determines whether it has sufficient memory capacity, processor capacity and receipt bandwidth to process group membership reports. For example, the adjacent multicast ND 104 can maintain its processing capacity in terms of number of membership reports that per second.

At operation 205, the adjacent multicast ND 104 determines a query response interval based on the number of host NDs and the current processing capacity. The adjacent multicast ND 104 calculates a Required Processing Time (RPT) based on the number of host NDs and the processing capacity. For example, $$RPT = (\text{Number of host NDs}/(\text{ND104's processing capacity per second})) \quad (1)$$

Based on the RPT, the adjacent multicast ND 104 calculates a value of a query response interval (QRI):

$$QRI = \text{Minimum}[\text{General Query interval}(GQI), RPT] \quad (2)$$

where the RPT is calculated based on equation (1) and GQI indicates the frequency at which the adjacent multicast ND 104 sends query messages from an interface.

In some embodiments, the QRI determined at equation (2) is calculated QRI in seconds. In other embodiments, the QRI may be determined in milliseconds by multiplying the result of equation (2) by 1000.

At operation 207, the adjacent multicast ND transmits, to each one of the plurality of host NDs (e.g., to ND 102A and ND 102Z), a query message (e.g., respective query messages 209A-Z) including the determined query response interval. The query message causes the adjacent multicast ND to receive from each one of the plurality of host NDs a group membership report (213A-213Z) at a time interval defined by the query response interval. A query message (or as it may be referred to as membership query message) is sent by adjacent multicast ND 104 to determine which multicast addresses are of interest to systems (e.g., host NDs) attached to its network. As will be described in further details below with reference to FIGS. 2C-D, the adjacent multicast ND 104 periodically sends general membership query messages to refresh the group membership state for all systems on its network. In some embodiments, Group-Specific query messages can be sent for determining the reception state for a particular multicast address. In some embodiments, Group-and-Source-Specific query messages allow the adjacent multicast ND 104 to determine if any host NDs desire reception of messages sent to a multicast group from a source address specified in a list of unicast addresses. While the embodiments of the present invention are described with reference to general query messages that include an adaptive QRI, in other embodiments, the adaptive QRI is also included in the Group-Specific query messages or in the Group-and-Source-Specific query messages.

In some embodiments, the query response interval is encoded into the query messages as a value in milliseconds. Thus, in the embodiments where the query response interval is calculated in seconds, it is multiplied by a 1000 prior to being encoded in the query message.

In some embodiments, the adjacent multicast ND 104 causes an update of the general query interval that is used for timing the transmission of query request to the host NDs. For example, when RPT is determined to be greater than the general query interval (i.e., the minimum [RPT, GQI]= RPT), the adjacent multicast ND 104 causes this interval to be updated. In one embodiment, the adjacent multicast ND 104 can transmit an information message to an administrator of the multicast service. The information messages includes an indication that the query response interval has been updated to a value that is smaller than the value of the general query interval. This may cause the administrator to update the value of the GQI accordingly. The new GQI is updated to equal the RPT value. In another embodiment, the value of the RPT is automatically used to update the GQI at the adjacent multicast ND 104 without the need of informing the administrator. In some embodiments, when the administrator configures or reconfigures the general query interval with a given value, this value has a higher priority over an updated value automatically determined at the adjacent multicast ND 104. The update of the general query interval causes an even smoother processing of membership reports received at the adjacent multicast ND 104.

Figure 3:
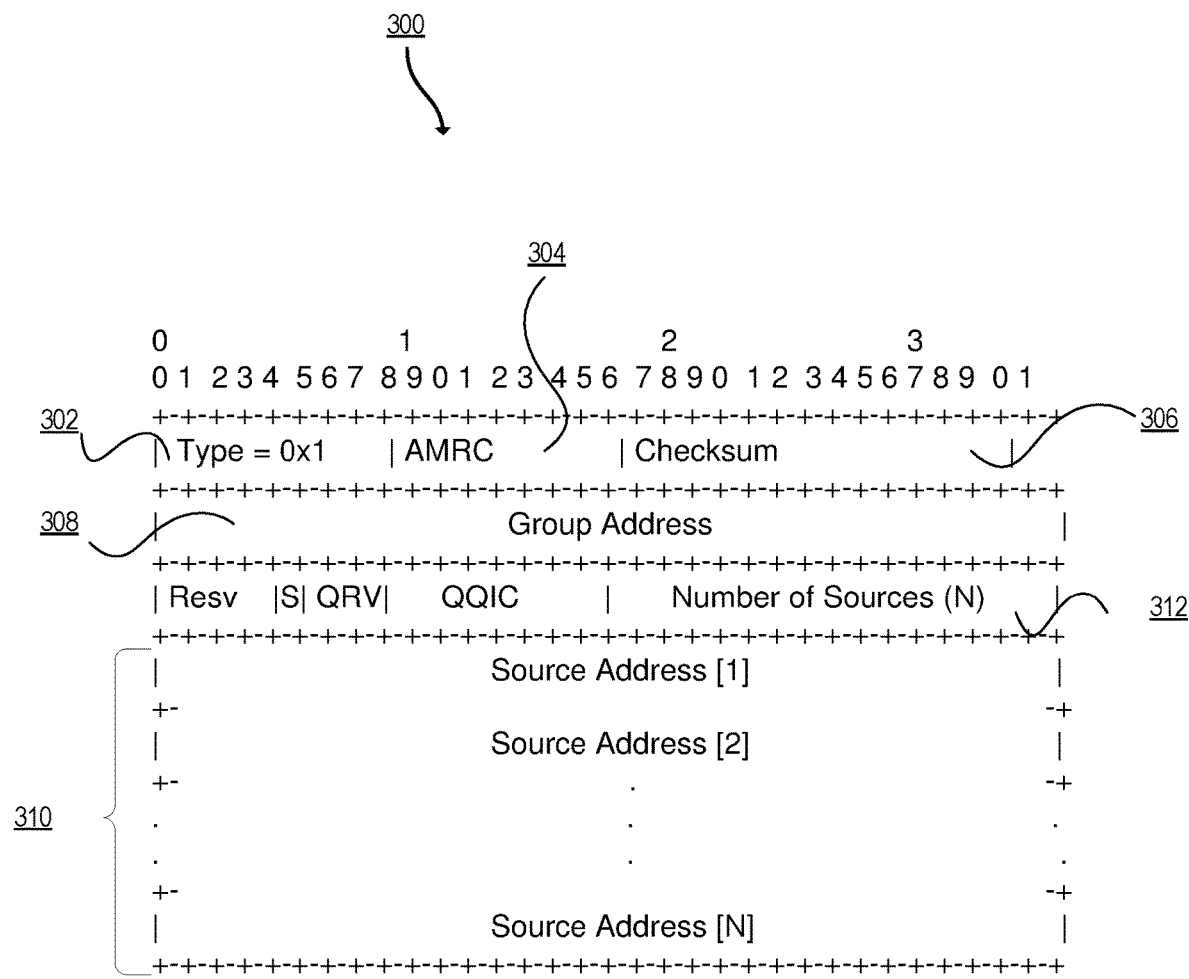
FIG. 3 illustrates a block diagram of an exemplary query message for enabling an enhanced multicast group membership registration, in accordance with some embodiments.

FIG. 3 illustrates a block diagram of an exemplary query message 300 for enabling an enhanced multicast group membership registration, in accordance with some embodiments. The query message 300 includes multiple fields 302-312. The field 302 indicates the type of the message. The AMRC 304 field is an adaptive maximum response code that indicates a representation of the maximum time allowed before a host ND is to send a response report. The time allowed is represented in units of ⅒ second and is determined as the newly calculated query response interval. The query message 300 also includes a checksum 306. The checksum field is the 16-bit one's complement of the one's complement sum of the entire query message (the entire IP payload). The query message 300 also includes a group address field 308. The group address field is set to zero when sending a General Query, and set to the IP multicast address being queried when sending a Group-Specific Query or Group-and-Source-Specific Query. The query message 300 also includes a number of sources field 312. The Number of Sources (N) field 312 specifies how many source addresses are present in the query message. This number is zero in a General Query or a Group-Specific Query. The query message 300 also includes the Source Address [i] fields 310. The fields 310 are a vector of n IP unicast addresses, where n is the value in the Number of Sources (N) field 312.

Figure 2B:
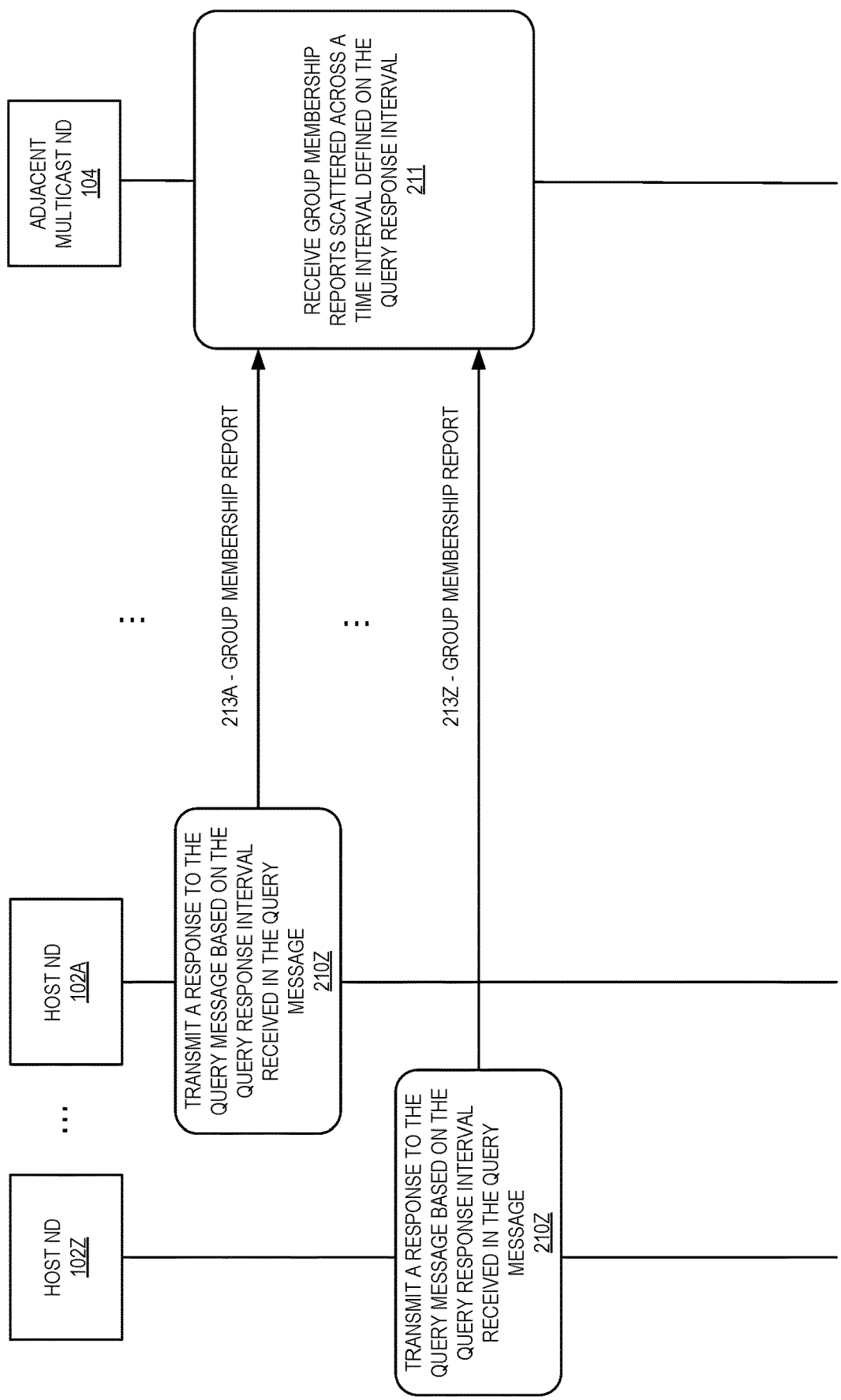
FIG. 2B illustrates a transactional diagram of exemplary operations for receiving group membership reports according to an enhanced multicast group membership registration process, in accordance with some embodiments.

FIG. 2B illustrates a transactional diagram of exemplary operations for receiving group membership reports according to an enhanced multicast group membership registration process, in accordance with some embodiments.

When one of the host NDs 102A-Z receives a query message (e.g., message 209A-209Z), it starts a timer that has a threshold value that is randomly selected from the range of 0 to QRI as encoded in the query message (for example as described with reference to FIG. 3, the adaptive maximum response code acts as upper limit of the range used for selecting the threshold value). Once the timer expires, the host ND transmits a response to the adjacent multicast ND 104 (operations 210A-Z). The response includes a group membership report (213A-213Z) indicating the multicast streams (as defined with their respective groups/sources) for which the host ND would like to receive traffic for. At operation 211, the adjacent multicast ND 104 receives the group membership reports at a frequency defined by the query response interval. The responses (213A-Z) are sent and received based on the adaptable QRI that depends on the number of host NDs coupled with the adjacent multicast ND 104 and depends on the current processing capacity of the adjacent multicast ND 104. As a result, when the value of QRI increases, the group membership reports are scattered across the QRI causing a smooth receipt of the reports which avoids the burstiness of the prior art approaches.

Figure 2C:
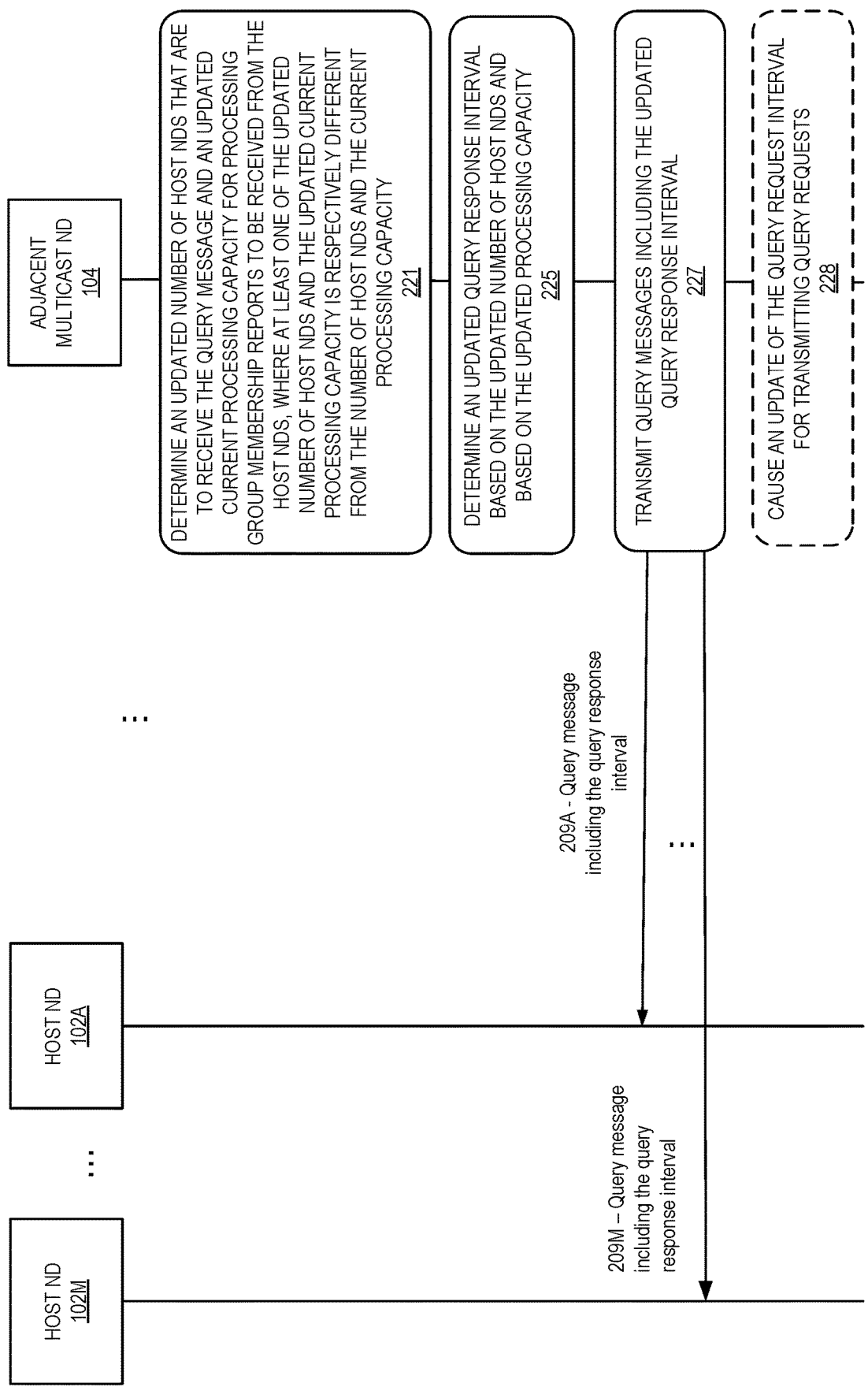
FIG. 2C illustrates a transactional diagram of exemplary operations for transmitting query messages according to an enhanced multicast group membership registration process in accordance with some embodiments.

FIG. 2C illustrates a transactional diagram of exemplary operations for transmitting query messages according to an enhanced multicast group membership registration process in accordance with some embodiments. The process of transmitting query messages from the adjacent multicast ND 104 to one or more host NDs 102A-Z that are coupled with the adjacent multicast ND 104 is repeated according to the general query interval. In some embodiments, the adjacent multicast ND 104 runs a timer up to the limit indicated by the general query interval and transmits query messages to a host NDs when the timer is up. In other embodiments, in addition to the timer or alternatively to the timer, the adjacent multicast ND 104 may also repeat the process upon detection of a change in the state of the adjacent multicast ND 104. The change in the state of the adjacent multicast ND 104 can be caused by a different set of host NDs are coupled to the adjacent multicast ND 104 as a result of additional host NDs subscribing to the IP multicast services, or as a result of some host NDs cancelling a subscription to the IP multicast services. The change in the state of the adjacent multicast ND 104 can also be caused by a change in the processing capacity of the adjacent multicast ND 104.

At operation 221, the adjacent multicast ND 104 determines an updated number of host NDs that are to receive the query message and an updated current processing capacity for processing group membership reports to be received from the host ND, where at least one of the updated number of host NDs and the updated current processing capacity is respectively different from the number of host NDs and the current processing capacity. As discussed above, the updated number of host NDs and the updated current processing capacity of the adjacent multicast ND 104 can be determined after expiration of a timer or alternatively after detection that a change in state has occurred. In some embodiments, after expiration of the timer, the adjacent multicast ND 104 may still be coupled to the same number of host NDs (as in the previous operation 201) and the processing capacity may also remain the same. In these embodiments, the adjacent multicast ND 104 may determine not to recalculate the QRI as this value will not change if none of the number of host NDs nor the processing capacity changes. In other embodiments, when at least one of the updated number of host NDs and the current processing capacity is a new value different from a preceding value, the following operations are performed.

At operation 225, the adjacent multicast ND 104 determines an updated query response interval based on the updated number of host NDs and the updated processing capacity of the adjacent multicast ND 104. The updated query response interval is calculated similarly to the query response interval discussed in FIG. 2A based on equations (1) and (2). Determining and using this updated query response interval enable the adjacent multicast ND 104 to quickly adapt to changes that occur in the network (adding or subtracting new host NDs to support) and to changes in its internal processing capacity. The adjacent multicast ND 104 transmits this information via the query messages.

At operation 227, the adjacent multicast ND transmits, to each one of the plurality of host NDs (e.g., to ND 102A and ND 102M), a query message (e.g., respective query messages 229A-M) including the updated query response interval. The query message causes the adjacent multicast ND to receive from each one of the plurality of host NDs a group membership report (233A-233M) at a time interval defined by the updated query response interval.

In some embodiments, the adjacent multicast ND 104 causes an update of the general query interval that is used for timing the transmission of query request to the host NDs. For example, when RPT is determined to be greater than the general query interval (i.e., the minimum [RPT, GQI]= RPT), the adjacent multicast ND 104 causes this interval to be updated. In one embodiment, the adjacent multicast ND 104 can transmit an information message to an administrator of the multicast service. The information messages includes an indication that the query response interval has been updated to a value that is smaller than the value of the general query interval. This may cause the administrator to update the value of the GQI accordingly. The new GQI is updated to equal the RPT value. In another embodiment, the value of the RPT is automatically used to update the GQI at the adjacent multicast ND 104 without the need of informing the administrator. In some embodiments, when the administrator configures or reconfigures the general query interval with a given value, this value has a higher priority over an updated value automatically determined at the adjacent multicast ND 104. The update of the general query interval causes an even smoother processing of membership reports received at the adjacent multicast ND 104.

Figure 2D:
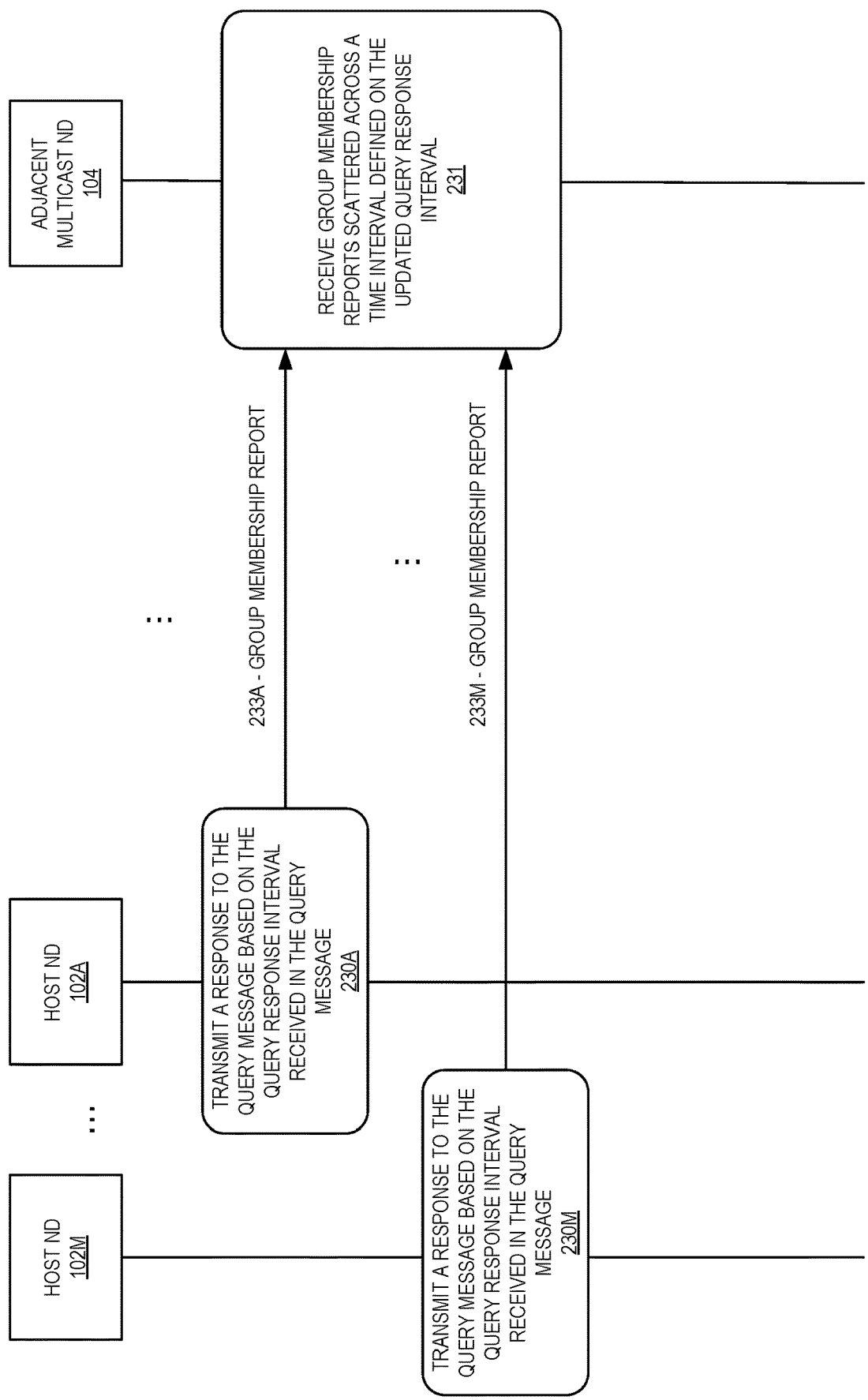
FIG. 2D illustrates a transactional diagram of exemplary operations for receiving group membership reports according to an enhanced multicast group membership registration process, in accordance with some embodiments.

FIG. 2D illustrates a transactional diagram of exemplary operations for receiving group membership reports according to an enhanced multicast group membership registration process, in accordance with some embodiments.

When one of the host NDs 102A-M receives a query message (e.g., message 229A-229M), it starts a timer that has a threshold value that is randomly selected from the range of 0 to updated QRI as encoded in the query message (for example as described with reference to FIG. 3, the adaptive maximum response code acts as upper limit of the range used for selecting the threshold value). Once the timer expires, the host ND transmits a response to the adjacent multicast ND 104 (operations 230A-M). The response includes a group membership report (233A-233M) indicating the multicast streams (as defined with their respective groups/sources) for which the host ND would like to receive traffic for. At operation 231, the adjacent multicast ND 104 receives the group membership reports at a frequency defined by the query response interval. The responses (233A-M) are sent and received based on the adaptable QRI that depends on the number of host NDs coupled with the adjacent multicast ND 104 and depends on the current processing capacity of the adjacent multicast ND 104. As a result, when the value of QRI increases, the group membership reports are scattered across the QRI causing a smooth receipt of the reports which avoids the burstiness of the prior art approaches.

Figure 4:
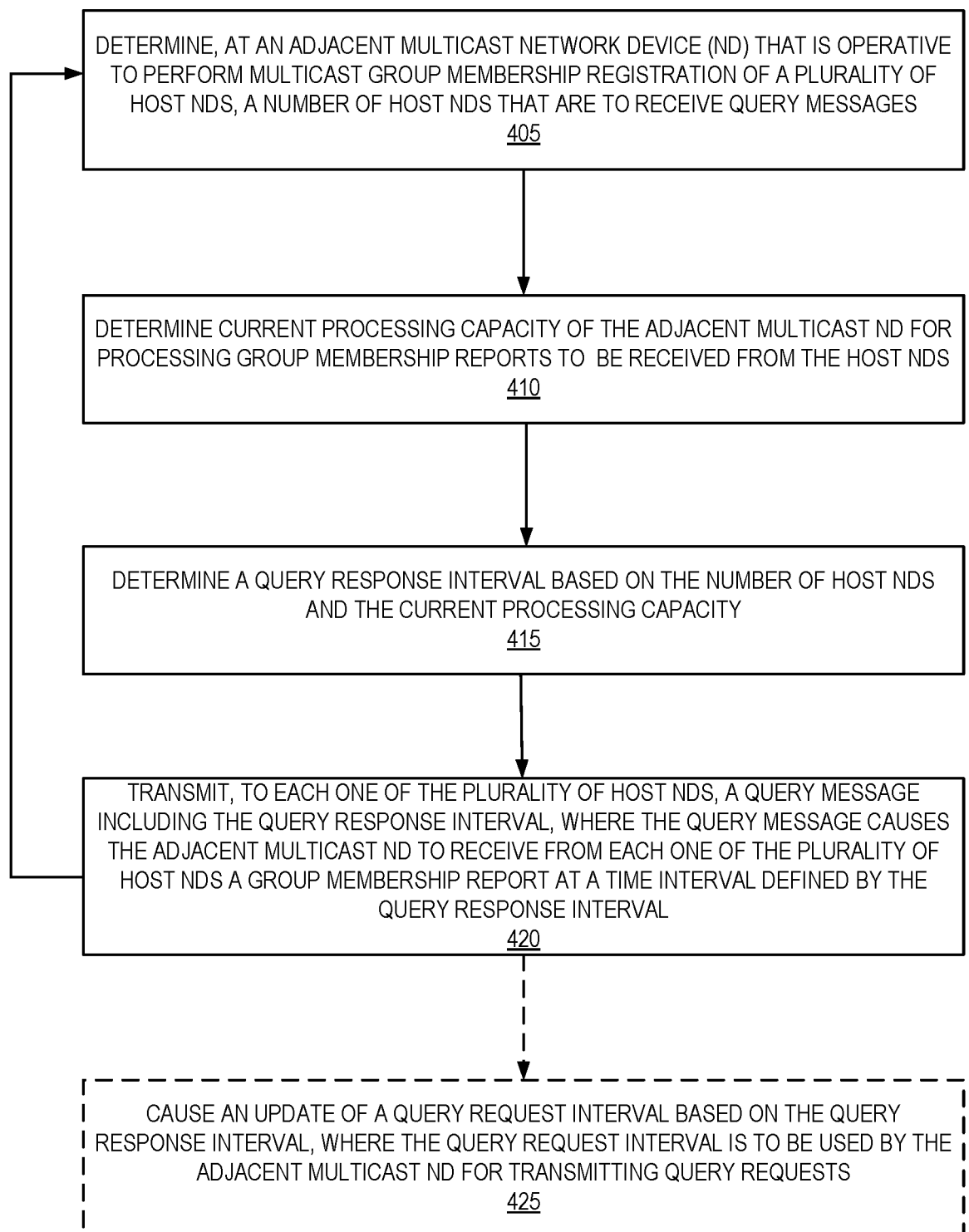
FIG. 4 illustrates a flow diagram of exemplary operations for enabling an enhanced multicast group membership registration, in accordance with some embodiments.

FIG. 4 illustrates a flow diagram of exemplary operations for enhancing multicast group membership protocol, in accordance with some embodiments. The operations in the flow diagram of FIG. 4 will be described with reference to the exemplary embodiments of the FIGS. 1-3. However, it should be understood that the operations of FIG. 4 can be performed by embodiments of the invention other than those discussed with reference to FIGS. 1-3, and the embodiments of the invention discussed with reference to these other figures can perform operations different than those discussed with reference to the flow diagram of FIG. 4.

At operation 405, an adjacent multicast network device (e.g., ND 104) determines a number of host NDs that are to receive query messages. The adjacent multicast ND is operative to perform multicast group membership registration of a plurality of host NDs (e.g., host NDs 102A-102Z).

At operation 410, the adjacent multicast ND determines its current processing capacity for processing group membership reports to be received from the host NDs. For example, the adjacent multicast ND 104 determines whether it has sufficient memory capacity, processor capacity and transmission bandwidth capacity to process incoming group membership reports.

Flow then moves to operation 415, at which the adjacent multicast ND determines a query response interval based on the number of host NDs and the current processing capacity. At operation 420, the adjacent multicast ND transmits, to each one of the plurality of host NDs (e.g., to ND 102A and ND 102Z), a query message (e.g., respective query messages 209A-Z) including the query response interval. The query message causes the adjacent multicast ND to receive from each one of the plurality of host NDs a group membership report (213A-213Z) at a time interval defined by the query response interval.

The operations of the flow diagram 405-420 repeat such that the adjacent multicast ND can dynamically determine a query response interval that is based on current processing power and capacity of the adjacent multicast ND as well as on the number of NDs that are to receive these query messages. For example, in one embodiment, the adjacent multicast ND may be operative to repeat the operations 405-420 when a change in either one of the processing capacity or the number of ND to be queried occurs. In other embodiments, the operations 405-420 may be repeated regularly at a given predetermined interval.

In some embodiments, the flow of operations further includes causing, at operation 425, an update of a query request interval based on the query response interval. The query request interval is to be used by the adjacent multicast ND for transmitting query requests. For example, the adjacent multicast ND can transmit after expiration of this interval a query message to each one of the host NDs coupled with the adjacent multicast ND.

The embodiments of the present invention enable the determination of a dynamic QRI value that is adaptable to the number of hosts and adaptable to the platform processing capability/capacity. The dynamic determination of the QRI allows to smoothen the burstiness of the membership reports of the multicast group registration protocols (such as IGMP and MLDP) received at the adjacent multicast ND and enables better scalability and reliability of the adjacent multicast ND when offering multicast functionality.

Architecture

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 5A:
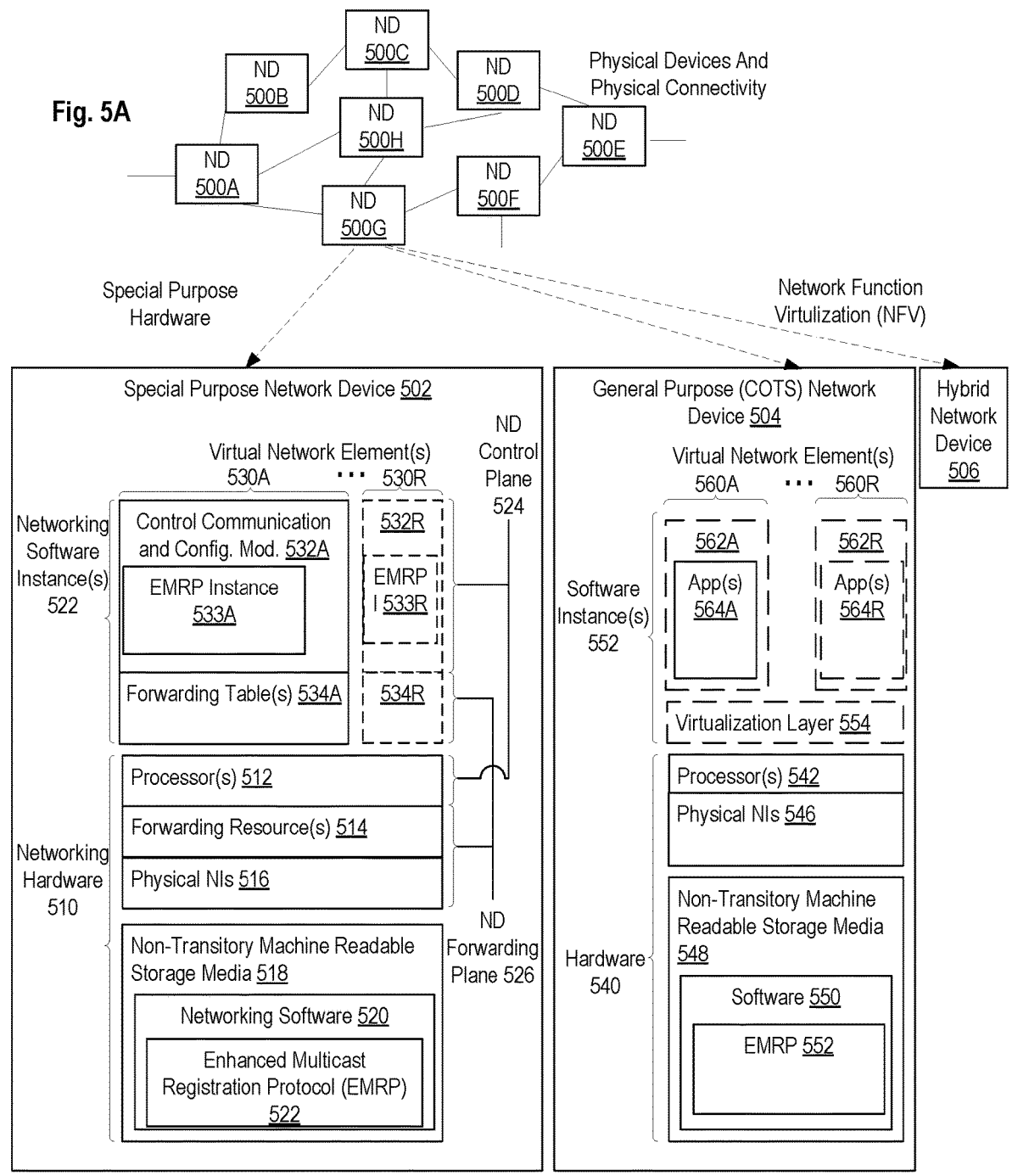
FIG. 5A illustrates connectivity between network devices (NDs) within an exemplary network, as well as three exemplary implementations of the NDs, according to some embodiments of the invention.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a special-purpose operating system (OS); and 2) a general purpose network device 504 that uses common off-the-shelf (COTS) processors and a standard OS.

The special-purpose network device 502 includes networking hardware 510 comprising a set of one or more processor(s) 512, forwarding resource(s) 514 (which typically include one or more ASICs and/or network processors), and physical network interfaces (NIs) 516 (through which network connections are made, such as those shown by the connectivity between NDs 500A-H), as well as non-transitory machine readable storage media 518 having stored therein networking software 520. During operation, the networking software 520 (which includes the Enhanced multicast membership protocol (EMRP) 522) may be executed by the networking hardware 510 to instantiate a set of one or more networking software instance(s) 522 (that includes EMRP instances 533A-R). Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A). During operation, the EMRP 522 can be executed by the networking hardware 510 to perform the operations discussed with reference to FIGS. 1-4.

The special-purpose network device 502 is often physically and/or logically considered to include: 1) a ND control plane 524 (sometimes referred to as a control plane) comprising the processor(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the processor(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
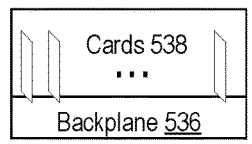
FIG. 5B illustrates an exemplary way to implement a special-purpose network device according to some embodiments of the invention.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and 5 physical NIs 546, as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including driversilibraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R. During operation, the EMRP 552 can be executed by the hardware 540 to perform the operations discussed with reference to FIGS. 1-4.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the physical NI(s) 546, as well as optionally between the instances 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service— e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the processor(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 5C illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5C illustrates network elements (NEs) 570A-H with the same connectivity as the NDs 500A-H of FIG. 5A.

FIG. 5C illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the processor(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5C illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the processor(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5C also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5C shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5C illustrates the simple case where each of the NDs 500A-H implements a single NE 570A-H, it should be understood that the network control approaches described with reference to FIG. 5C also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the invention has been described in terms of several embodiments, those skilled in the art will recognize that the invention is not limited to the embodiments described, can be practiced with modification and alteration within the spirit and scope of the appended claims. For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.). The description is thus to be regarded as illustrative instead of limiting.

What is claimed is:

1. A method of enhancing multicast group membership protocol, the method comprising:
   determining, at an adjacent multicast network device (ND) that is operative to perform multicast group membership registration of a plurality of host NDs, a number of host NDs that are to receive query messages;
   determining current processing capacity of the adjacent multicast ND for processing group membership reports to be received from the host NDs;
   determining a query response interval based on the number of host NDs and the current processing capacity;
   transmitting, to each one of the plurality of host NDs, a query message including the query response interval, wherein the query message causes the adjacent multicast ND to receive from each one of the plurality of host NDs a group membership report at a time interval defined by the query response interval; and
   causing an update of a general query interval based on the query response interval, wherein the general query interval is to be used by the adjacent multicast ND for transmitting query requests.

2. The method of claim 1, wherein causing an update of the general query interval includes at least one of automatically updating a value of the general query interval at the adjacent multicast ND and transmitting a message to an administrator of the adjacent multicast ND to inform of a need for modifying the general query interval based on the query response interval.

3. The method of claim 1 further comprising:
   determining an updated number of host NDs that are to receive a next query message and an updated processing capacity for processing group membership reports to be received from the host NDs, where at least one of the updated number of host NDs and the updated processing capacity is respectively different from the number of host NDs and the current processing capacity.

4. The method of claim 3, wherein determining the updated number of host NDs and the update processing capacity is performed prior to expiration of a query request interval.

5. The method of claim 3 further comprising:
in response to determining the updated number of host NDs and the updated processing capacity, determining an updated query response interval based on the updated number of host NDs and based on the updated processing capacity.

6. The method of claim 5 further comprising:
transmitting, to each one of the plurality of host NDs, a query message including the updated query response interval, wherein the query message causes the adjacent multicast ND to receive from each one of the plurality of host NDs a query message at a time interval defined by the updated query response interval.

7. The method of claim 1, wherein transmitting the query message includes at least one of transmitting a MLD query message and transmitting an IGMP query message.

8. The method of claim 1, wherein the group membership report includes an indication of at least one multicast group that a host ND subscribes to.

9. A network device for enhancing multicast group membership protocol, the network device comprising:
a non-transitory computer readable storage medium to store instructions; and
a processor coupled with the non-transitory computer readable storage medium to process the stored instructions to:
determine, at an adjacent multicast network device (ND) that is operative to perform multicast group membership registration of a plurality of host NDs, a number of host NDs that are to receive query messages,
determine current processing capacity of the adjacent multicast ND for processing group membership reports to be received from the host NDs,
determine a query response interval based on the number of host NDs and the current processing capacity,
transmit, to each one of the plurality of host NDs, a query message including the query response interval, wherein the query message causes the adjacent multicast ND to receive from each one of the plurality of host NDs a group membership report at a time interval defined by the query response interval; and
cause an update of a general query interval based on the query response interval, wherein the general query interval is to be used by the adjacent multicast ND for transmitting query requests.

10. The network device of claim 9, wherein to cause an update of the general query interval includes at least one of automatically to update a value of the general query interval at the adjacent multicast ND and to transmit a message to an administrator of the adjacent multicast ND to inform of a need for modifying the general query interval based on the query response interval.

11. The network device of claim 9, wherein the processor is further to:
determine an updated number of host NDs that are to receive a next query message and an updated processing capacity for processing group membership reports to be received from the host NDs, where at least one of the updated number of host NDs and the updated processing capacity is respectively different from the number of host NDs and the current processing capacity.

12. The network device of claim 11, wherein to determine the updated number of host NDs and the update processing capacity is performed prior to expiration of a query request interval.

13. The network device of claim 11, wherein the processor is further to:
in response to determining the updated number of host NDs and the updated processing capacity, determine an updated query response interval based on the updated number of host NDs and based on the updated processing capacity.

14. The network device of claim 13, wherein the processor is further to:
transmit, to each one of the plurality of host NDs, a query message including the updated query response interval, wherein the query message causes the adjacent multicast ND to receive from each one of the plurality of host NDs a query message at a time interval defined by the updated query response interval.

15. The network device of claim 9, wherein to transmit the query message includes at least one of to transmit a MLD query message and to transmit an IGMP query message.

16. The network device of claim 9, wherein the group membership report includes an indication of at least one multicast group that a host ND subscribes to.

17. A non-transitory computer readable storage medium that provide instructions, which when executed by a processor of a proxy server, cause said processor to perform operations comprising:
determining, at an adjacent multicast network device (ND) that is operative to perform multicast group membership registration of a plurality of host NDs, a number of host NDs that are to receive query messages;
determining current processing capacity of the adjacent multicast ND for processing group membership reports to be received from the host NDs;
determining a query response interval based on the number of host NDs and the current processing capacity;
transmitting, to each one of the plurality of host NDs, a query message including the query response interval, wherein the query message causes the adjacent multicast ND to receive from each one of the plurality of host NDs a group membership report at a time interval defined by the query response interval; and
causing an update of a general query interval based on the query response interval, wherein the general query interval is to be used by the adjacent multicast ND for transmitting query requests.

18. The non-transitory computer readable storage medium of claim 17, wherein causing an update of the general query interval includes at least one of automatically updating a value of the general query interval at the adjacent multicast ND and transmitting a message to an administrator of the adjacent multicast ND to inform of a need for modifying the general query interval based on the query response interval.

19. The non-transitory computer readable storage medium of claim 17, wherein the operations further comprise:
determining an updated number of host NDs that are to receive a next query message and an updated processing capacity for processing group membership reports to be received from the host NDs, where at least one of the updated number of host NDs and the updated processing capacity is respectively different from the number of host NDs and the current processing capacity.

20. The non-transitory computer readable storage medium of claim 19, wherein determining the updated number of host NDs and the update processing capacity is performed prior to expiration of a query request interval.

21. The non-transitory computer readable storage medium of claim 19, wherein the operations further comprise:

in response to determining the updated number of host NDs and the updated processing capacity, determining an updated query response interval based on the updated number of host NDs and based on the updated processing capacity.

22. The non-transitory computer readable storage medium of claim 21, wherein the operations further comprise:
transmitting, to each one of the plurality of host NDs, a query message including the updated query response interval, wherein the query message causes the adjacent multicast ND to receive from each one of the plurality of host NDs a query message at a time interval defined by the updated query response interval.

23. The non-transitory computer readable storage medium of claim 17, wherein transmitting the query message includes at least one of transmitting a MLD query message and transmitting an IGMP query message.

24. The non-transitory computer readable storage medium of claim 17, wherein the group membership report includes an indication of at least one multicast group that a host ND subscribes to.

\* \* \* \* \*